(12) United States Patent
Vignet

(10) Patent No.: US 7,610,549 B2
(45) Date of Patent: Oct. 27, 2009

(54) METHOD AND SYSTEM FOR JAVA GANTT/BAR CHART RENDERING

(75) Inventor: Peter Vignet, San Francisco, CA (US)

(73) Assignee: SAP AG, Walldorf (DE)

( * ) Notice: Subject to any disclaimer, the term of this patent is extended or adjusted under 35 U.S.C. 154(b) by 435 days.

(21) Appl. No.: 10/852,764

(22) Filed: May 20, 2004

(65) Prior Publication Data

US 2005/0262425 A1 Nov. 24, 2005

(51) Int. Cl.
*G06F 17/00* (2006.01)
*G06F 7/00* (2006.01)

(52) U.S. Cl. .............. 715/227; 715/215; 715/243; 707/102; 707/104.1

(58) Field of Classification Search ........... 707/100, 707/104.1, 102; 705/8, 1, 9; 715/215, 227, 715/243; 700/99, 100
See application file for complete search history.

(56) References Cited

U.S. PATENT DOCUMENTS

| | | | | |
|---|---|---|---|---|
| 4,875,162 | A * | 10/1989 | Ferriter et al. ............ 705/29 |
| 5,247,438 | A * | 9/1993 | Subas et al. ............ 700/90 |
| 5,414,809 | A * | 5/1995 | Hogan et al. ............ 715/765 |
| 5,659,768 | A * | 8/1997 | Forbes et al. ............ 715/517 |
| 5,745,110 | A * | 4/1998 | Ertemalp ............ 715/764 |
| 5,818,715 | A * | 10/1998 | Marshall et al. ............ 705/8 |
| 5,907,490 | A * | 5/1999 | Oliver ............ 700/90 |
| 5,974,391 | A * | 10/1999 | Hongawa ............ 705/7 |
| 6,240,395 | B1 * | 5/2001 | Kumashiro ............ 705/7 |
| 6,282,514 | B1 * | 8/2001 | Kumashiro ............ 705/7 |
| 6,335,733 | B1 * | 1/2002 | Keren et al. ............ 345/418 |
| 6,674,450 | B1 * | 1/2004 | Toub et al. ............ 715/749 |
| 6,678,671 | B1 * | 1/2004 | Petrovic et al. ............ 707/1 |
| 6,708,293 | B2 * | 3/2004 | Kaler et al. ............ 714/39 |
| 6,732,114 | B1 * | 5/2004 | Aamodt et al. ............ 707/102 |
| 6,900,807 | B1 * | 5/2005 | Liongosari et al. ............ 345/440 |
| 6,928,436 | B2 * | 8/2005 | Baudel ............ 707/6 |
| 6,993,712 | B2 * | 1/2006 | Ramachandran et al. ............ 715/234 |
| 7,039,480 | B2 * | 5/2006 | Ooshima et al. ............ 700/97 |
| 7,096,222 | B2 * | 8/2006 | Kern et al. ............ 707/100 |
| 7,353,183 | B1 * | 4/2008 | Musso ............ 705/9 |
| 2002/0075293 | A1 * | 6/2002 | Charisius et al. ............ 345/704 |
| 2002/0091871 | A1 * | 7/2002 | Cahill et al. ............ 709/315 |
| 2003/0041087 | A1 * | 2/2003 | Pothos et al. ............ 709/102 |
| 2003/0050065 | A1 * | 3/2003 | Alletson et al. ............ 455/445 |
| 2003/0066032 | A1 * | 4/2003 | Ramachandran et al. ............ 715/513 |

(Continued)

OTHER PUBLICATIONS

Vanhanen, Jari, et al., "Combining Data From Existing Company Data Sources: Architecture and Experiences", Proc. of the 33rd Hawaii Int'l Conf. on System Sciences, Jan. 4-7, 2000, pp. 1-6.*

(Continued)

*Primary Examiner*—Robert Stevens
(74) *Attorney, Agent, or Firm*—Blakely Sokoloff Taylor & Zafman

(57) ABSTRACT

A method and system for Java Gantt/bar chart rendering includes an extractor to receive project data, a table generator to generate a project table suitable for representing the project data, and a dynamic page component to generate a Gantt chart image utilizing the project table. The system further includes a cell rendering component to render at least one cell of the project table by identifying a suitable graphical image and by applying the graphical image to the cell.

34 Claims, 10 Drawing Sheets

U.S. PATENT DOCUMENTS

| | | | |
|---|---|---|---|
| 2003/0074391 A1* | 4/2003 | Carter et al. | 709/200 |
| 2003/0097288 A1* | 5/2003 | Shimomura et al. | 705/8 |
| 2003/0109950 A1* | 6/2003 | Andrade et al. | 700/103 |
| 2003/0137541 A1* | 7/2003 | Massengale et al. | 345/764 |
| 2003/0167278 A1* | 9/2003 | Baudel | 707/102 |
| 2004/0093600 A1* | 5/2004 | Takemura | 718/100 |
| 2004/0119713 A1* | 6/2004 | Meyringer | 345/440 |
| 2004/0196310 A1* | 10/2004 | Aamodt et al. | 345/738 |
| 2005/0039163 A1* | 2/2005 | Barrett et al. | 717/105 |
| 2005/0151739 A1* | 7/2005 | Barrett et al. | 345/440.2 |
| 2005/0160084 A1* | 7/2005 | Barrett | 707/3 |
| 2005/0171963 A1* | 8/2005 | Barrett | 707/100 |
| 2005/0198209 A1* | 9/2005 | Barrett | 709/219 |
| 2005/0216111 A1* | 9/2005 | Ooshima et al. | 700/99 |
| 2008/0077479 A1* | 3/2008 | Carter et al. | 705/10 |

OTHER PUBLICATIONS

"VARCHART XGantt: The ActiveX Control for Gantt Applications", NETRONIC Software Gmbh, © 2002, pp. 1-6.*

"Gantt Chart—2.x", webWise Network Consultants, downloaded from www.wnc.net.au/wnc/website.pma/p?OpenPage&Name=gantt2, Aug. 18, 2003, pp. 1-6.*

Khoo, L. P., "A Prototype Genetic Algorithm-Enhanced Multi-Objective Scheduler for Manufacturing Systems", International Journal of Advanced Manufacturing Technology, vol. 16, No. 2, Feb. 2000, pp. 131-138.*

Casanova, Henri, et al., "Heuristics for Scheduling Parameter Sweep Applications in Grid Environments", HCW 2000, Cancun, Mexico, © 2000, pp. 349-363.*

Malony, Allen D., et al., "Traceview: A Trace Visualization Tool", IEEE Software, vol. 8, Issue 5, Sep. 1991, pp. 19-28.*

Yu, Wai, et al., "Web-Based Multimodal Graphs for Visually Impaired People", CWUAAT, Cambridge, England, Mar. 25-27, 2002, pp. i and 1-13.*

El-Rewini, Hesham, et al., "Task Scheduling in Multiprocessing Systems", Computer, vol. 28, Issue 12, Dec. 1995, pp. 27-37.*

Myers, Brad A., et al., "Creating Charts by Demonstration", CHI '94, Boston, MA, Apr. 1994, pp. 106-111 and 475.*

Davis, J. Steve, et al., "Production Scheduling: An Interactive Graphical Approach", Journal of Systems and Software, vol. 38, Issue 2, Aug. 1997, pp. 155-163.*

O'Reilly, Jean J., et al., "Introduction to FACTOR/AIM", Proc. of the 31st Conf. on Winter Simulation: A Bridge to the Future—vol. 1, Phoenix, AZ, Dec. 5-8, 1999, pp. 201-207.*

Vanhanen, Jari, et al., "Combining Data from Existing Company Data Sources: Architecture and Experiences", Proc. of the 33rd Hawaii International Conf. on System Sciences, Jan. 4-7, 2000, pp. 1-6.*

Koh, Kwang-Hang, et al., "Database Driven Simulation / Simulation-Based Scheduling of a Job-Shop", Simulation Practice and Theory, vol. 4, Issue 1, Mar. 15, 1996, pp. 31-45.*

Clegg, B., et al., "Tool Support for Integrating Extended Enterprises", IEE Proceedings—Software, vol. 147, Issue 4, Aug. 2000, pp. 101-108.*

Marriott, Bob, "Production Scheduling Systems Using PROVISA", Proc. of the 26th Conf. on Winter Simulation, Orlando, FL, Dec. 11-14, 1994, pp. 522-526.*

Ehrlich, Julie N., et al., "Making Better Manufacturing Decisions with AIM", Proc. of the 29th Conf. on Winter Simulation, Atlanta, GA, Dec. 7-10, 1997, pp. 552-558.*

Gelbard, Roy, et al., "Integrating System Analysis and Project Management Tools", International Journal of Project Management, vol. 20, Issue 6, Aug. 2002, pp. 461-468.*

Bulbeck, J. M., et al., "A Systems Methodology for Analysing and Simulating Manufacturing Systems", IEEE International Conf. on Systems, Man and Cybernetics, Beijing, China, Oct. 14-17, 1996, pp. 778-783.*

Huang, G. Q., et al., "POPIM: Pragmatic Online Project Information Management for Collaborative Product Development", CSCWD 2001, London, Ontario, Canada, Jul. 12-14, 2001, pp. 255-260.*

Karhu, Vesa, "A View-Based Approach for Construction Process Modeling", Computer-Aided Civil and Infrastructure Engineering, vol. 18, Issue 4, Apr. 15, 2003, pp. 275-285.*

Kiponen, Pekka, et al., "ViCA—A WWW Based Tool for Visualizing Project Status", Proc. of the 33rd Hawaii International Conf. on System Sciences, Jan. 4-7, 2000, pp. 1-7.*

Higgins, Peter G., "Graphical Features for Aiding Decision-Making in Production Scheduling", OZCHI94, Melbourne, Australia, Nov. 28-Dec. 1, 1994, pp. 1-6.*

Heath, Michael T., et al., "Parallel Performance Visualization: From Practice to Theory", IEEE Parallel & Distributed Technology, vol. 3, Issue 4, Winter 1995, pp. 44-60.*

Cruz, Isabel F., et al., "As You Like It: Personalized Database Visualization Using a Visual Language", Journal of Visual Languages and Computing, vol. 12, © 2001, pp. 525-549.*

* cited by examiner

```
package bean;
/*
* A very simple bean whose only purpose is
* to store a simple String.
* It as a get and set method to store and recall the string.

*/
public class DynPageNameBean
{
public String name;
public String getName ()
{
return name;
}
public void setName (String name)
{
 this.name = name;
}
```

METHOD AND SYSTEM FOR JAVA GANTT/BAR CHART RENDERING

FIELD OF THE INVENTION

An embodiment relates generally to enterprise resource and program management, and more particularly to a method and system for Java Gantt/Bar chart rendering in an enterprise project portfolio management environment.

BACKGROUND OF THE INVENTION

Software applications in the field of enterprise project portfolio management attempt to integrate all facets of a business including planning, manufacturing, sales, and marketing. As the project portfolio management methodology has become more popular, software applications have emerged to help business managers implement project portfolio management in business activities to provide visibility into the entire portfolio of enterprise programs and projects, while supporting strategic capacity planning and resource allocation based on up-to-date information on skills and availability of the resources. It is desirable that an enterprise project portfolio management tool is capable of leveraging data from base systems without disruption, and can be delivered at an effective and predictable cost.

A Gantt chart may be a useful tool for providing a comprehensive view of the flow of the project. A Gantt chart is a horizontal bar chart, with a horizontal axis representing the total time span of a project, broken down into increments (for example, days, weeks, or months) and a vertical axis representing multiple projects or various tasks that make up the project. Gantt charts may be automatically created using a project management application.

SUMMARY OF THE INVENTION

A system for Java Gantt/bar chart rendering includes an extractor to receive project data, a table generator to generate a project table suitable for representing the project data, and a dynamic page component to generate a chart image utilizing the project table, the chart being one of a Gantt chart and a bar chart. The table generator is to receive a data model and a table model to generate the project table.

The system further includes a cell rendering component to render at least one cell of the project table, wherein the at least one cell represents a portion of the chart in accordance with the project data. The cell rendering component is to identify a graphical image from a plurality of graphical images and to apply the graphical image to the at least one cell. The graphical image from the plurality of graphical images represents one of a full time unit and a partial time unit.

The cell rendering component may further be to identify a background color and to apply the background color to the at least one cell if the data corresponding to the at least one cell is one of a full time unit and an empty time unit. The project data includes a project name, the start date of the project, and project duration.

The dynamic page component is to generate an event related to the at least one cell the event being utilized to display additional information responsive to identifying an action directed at the at least one cell. The action directed at the at least one cell is a click.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 4A is an implementation example of a reusable software component as a Java Bean, according to one embodiment of the present invention;

DETAILED DESCRIPTION

A method and system to generate a Gantt/bar chart are described. In the following description, for purposes of explanation, numerous specific details are set forth in order to provide a thorough understanding of the present invention. It will be evident, however, to one skilled in the art that the present invention may be practiced without these specific details.

In a web-based environment, graphics (e.g., a graph or a chart) is often rendered to a user utilizing an applet (e.g., a Java applet), which may be run within an Internet browser. However, a Java applet may be resource intensive. It may require loading a number of data and, depending on a client machine, there may be a considerable delay in rendering the graph. Thus, there is a need for a method of rendering graphics, such as, for example, a bar chart or a Gantt chart, which is independent of browser Java applets and that may exhibit enhanced performance.

Figure 1:
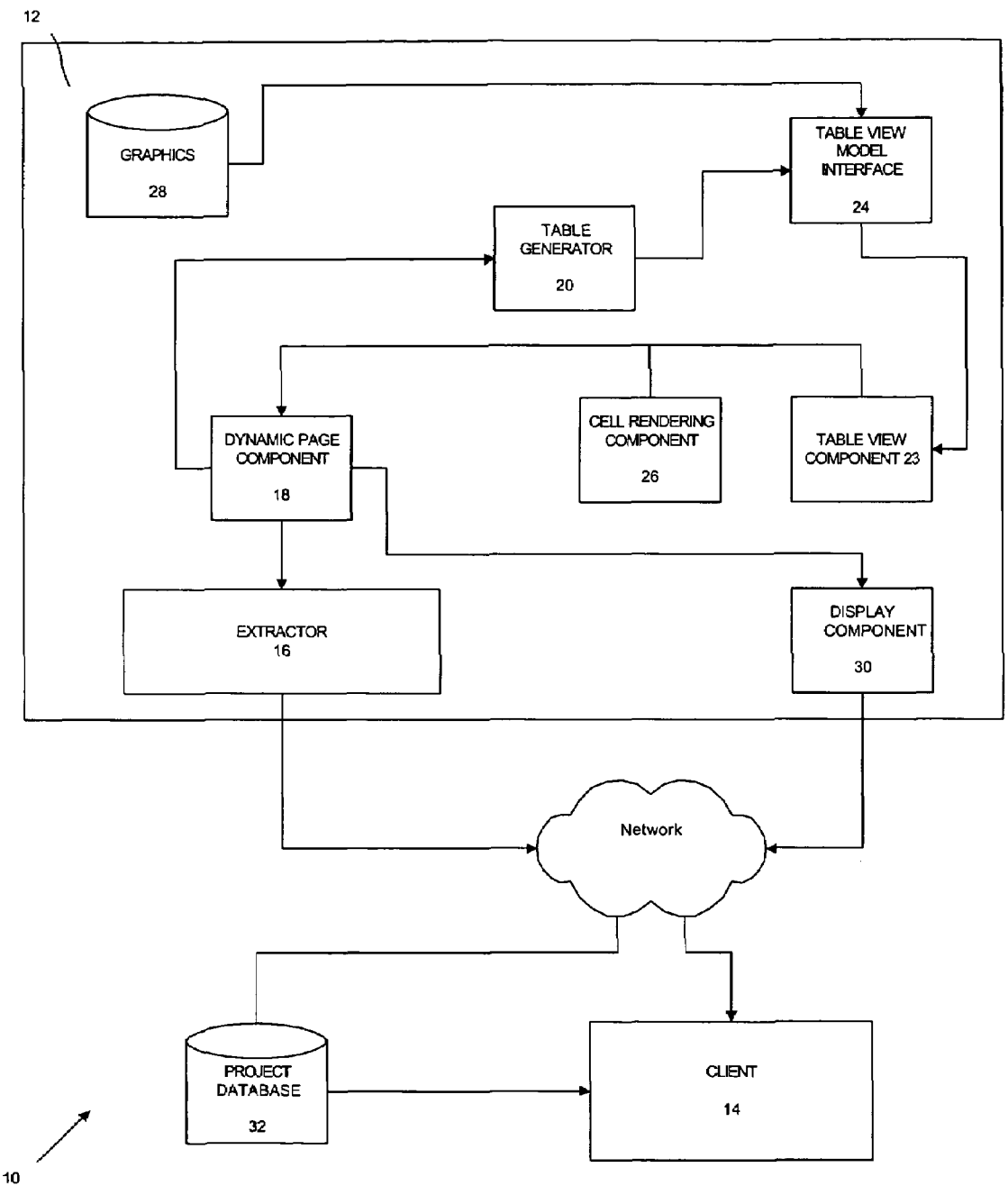
FIG. 1 is a network diagram depicting a system having a client-server architecture, according to one embodiment of the present invention.

FIG. 1 is a network diagram depicting a system 10, according to one exemplary embodiment of the present invention, having client-server architecture. A business platform, in the exemplary form of a network-based electronic project portfolio management system 12, provides server-side functionality, via a network 16 (e.g., the Internet) to one or more clients 14. The project portfolio management system 12 may be configured to provide a number of business management functions and services to users. In FIG. 1, the client 14 may be any computing device, including a laptop computer, notebook computer, personal digital assistant (PDA), or handheld wireless phone.

The project portfolio management system 12 of FIG. 1 may be accessed by the client 14 via the network 16. The system 10 allows the client 14 to request and receive a graphical representation of the client's project data. The project portfolio management system 12 may include an extractor 16, dynamic page components 18, table generators 20, table view components 23, table view model interfaces 24, cell rendering components 26, a graphics repository 28, and a display component 30. The extractor 16 may be configured to receive a client's request for a Gantt/bar chart in accordance with the client's project data. The client's project data may be stored in a project database 32. The dynamic page component 18 may be configured to receive the project data from the extractor 16 and to provide this data to the table generator 20.

The dynamic page component 18 may generate dynamic web pages and provide them to the display component 30. In order to provide a tabular representation of data within a dynamic web page, the dynamic page component 18 requests a tabular representation to be generated by the table generator 20. The dynamic page component 18 utilizes tables generated by the table generator 20 and the table view model interface 24 to create table view models. A table view model may contain the repository location of graphics from the graphics repository 28 if, for example, a cell within a table is to include graphics.

The dynamic page component 18 utilizes the table view component 23 with the table view model to create a table view. In one exemplary embodiment, a table view model may use a growable array of objects (e.g., vectors) to supply the table view with data. Visible columns are a subset of the data in a table view model. The dynamic page component 18 utilizes the table view component 23 to create a table view to display any data model which implements the table view model interface.

In one exemplary embodiment of the present invention, the dynamic page component 18 utilizes the cell rendering component 26 to render cells in accordance with the table view and its model. In one exemplary embodiment, the cell rendering component 26 renders cells by inserting dynamically graphical images into the table view in accordance with the table view and its model of the project data. The graphical images may be stored in the graphics repository 28. It will be noted that the graphics repository 28 may be a component of the project portfolio management system 12 or in communication with the project portfolio management system 12.

Figure 2:
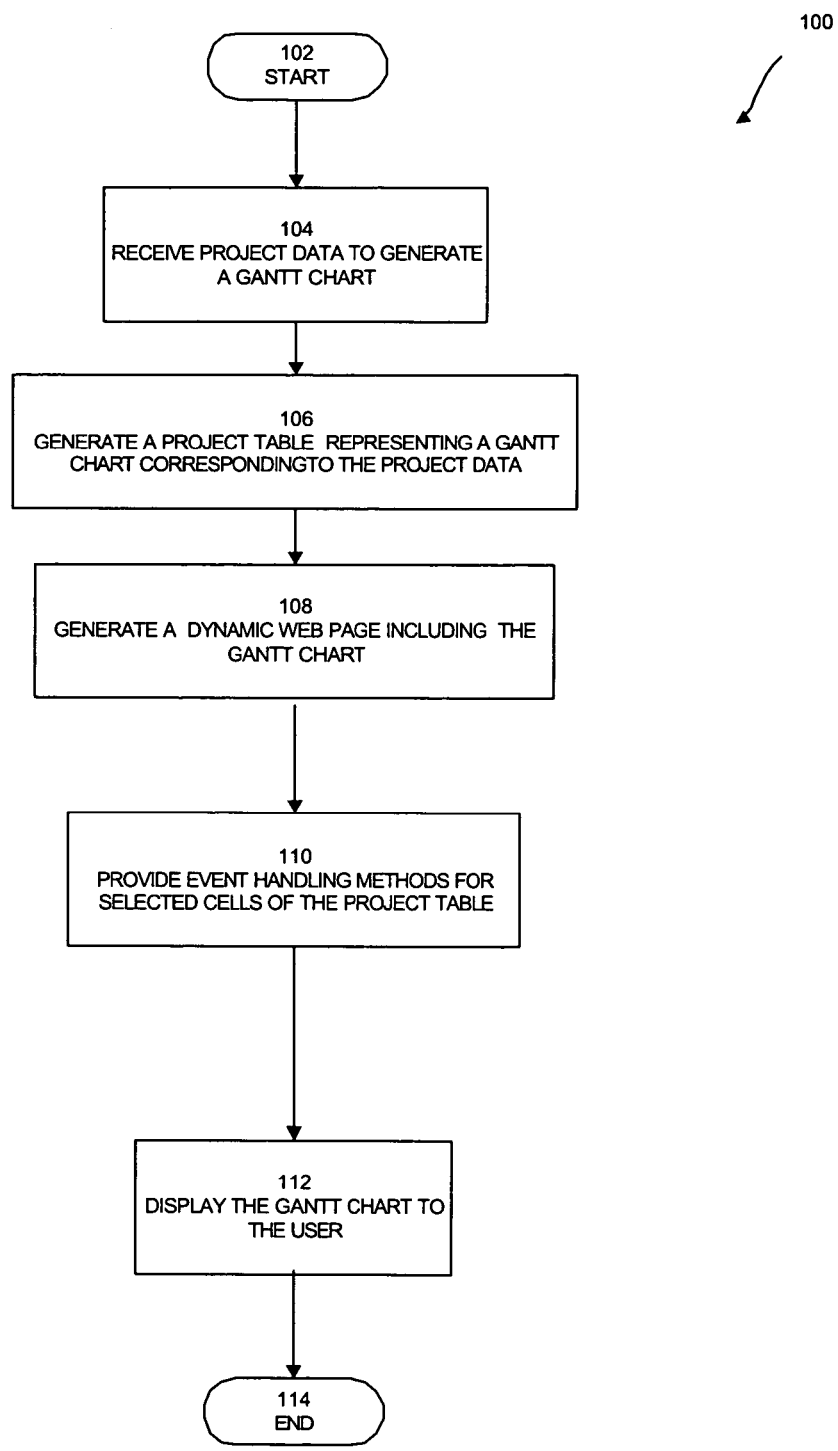
FIG. 2 is a flowchart illustrating a method to create a Gantt/bar chart, according to one embodiment of the present invention.

FIG. 2 is a flowchart illustrating a method 100 to create a Gantt/bar chart according to one embodiment of the present invention. The method 100 starts at operation 102. At operation 104, the extractor 16 receives project data from the client 14 in order to generate a Gantt chart. At operation 106, the table generator 20 is utilized to generate a project table representing a Gantt chart corresponding to the project data. At operation 108, the dynamic page component 18 is utilized to generate a dynamic web page including the Gantt chart. The dynamic page component 18 may be adapted to provide event-handling methods for selected cells in the project table generated by the table generator 20 at operation 110. At operation 112, the display component 30 is provided with the dynamic page including the Gantt chart corresponding to the project data. The display component 30 may display the Gantt chart to the client 14, responsive to a request from the client 14 or responsive to some other event. The method ends at operation 114.

Figure 2A:
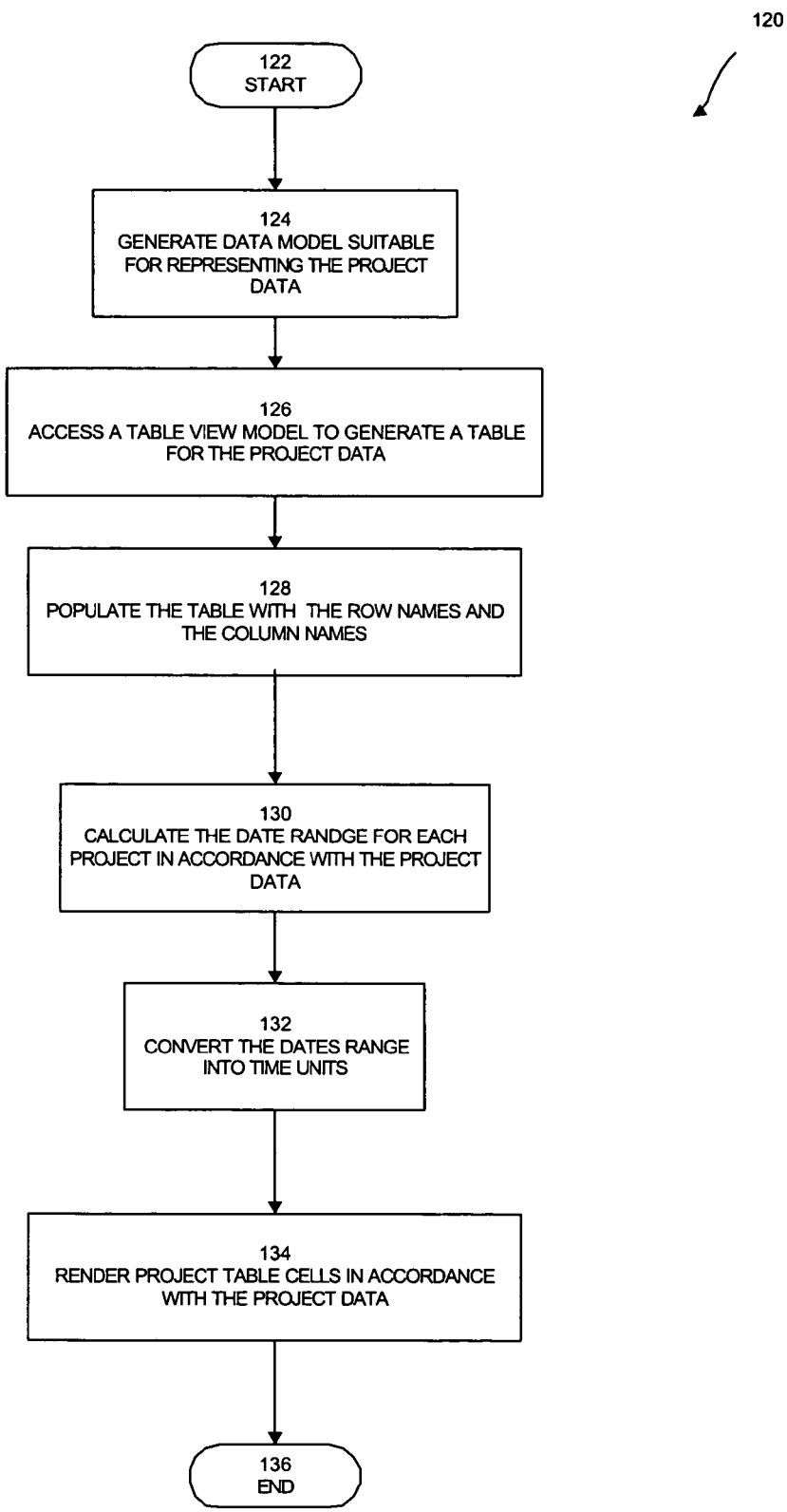
FIG. 2A is a flowchart illustrating a method to generate a table in accordance with project data, according to one embodiment of the present invention

FIG. 2A is a flowchart illustrating a method 120 to generate a project table in accordance with project data. The method 100, in one embodiment, corresponds to operation 106 of FIG. 2. The method commences at operation 122. At operation 124, the table generator 20 generates a data model suitable for representing the project data provided by the client 14. At operation 126, the table generator 20 accesses a table view component 23 to identify a table view model suitable for representing the project data. At operation 128, the project table is populated with the row names and the column names. In one exemplary embodiment, the row names may correspond to the project names in accordance with the project data. It will be noted that the project names may correspond to project tasks or to subprojects. The column names of the project table may correspond to time units such as, for example, months, weeks, or days. At operation 130, the table generator 20 interrogates the project data to identify the project start date and the project end date for each project in the project data. The table generator 20 then calculates the date ranges for each project in accordance with the project data utilizing the identified project start dates and project end dates. At operation 134, the table generator 20 utilizes cell-rendering component 26 so that the table cells are rendered in accordance with the project data. The method 120 ends at operation 136.

Figure 2B:
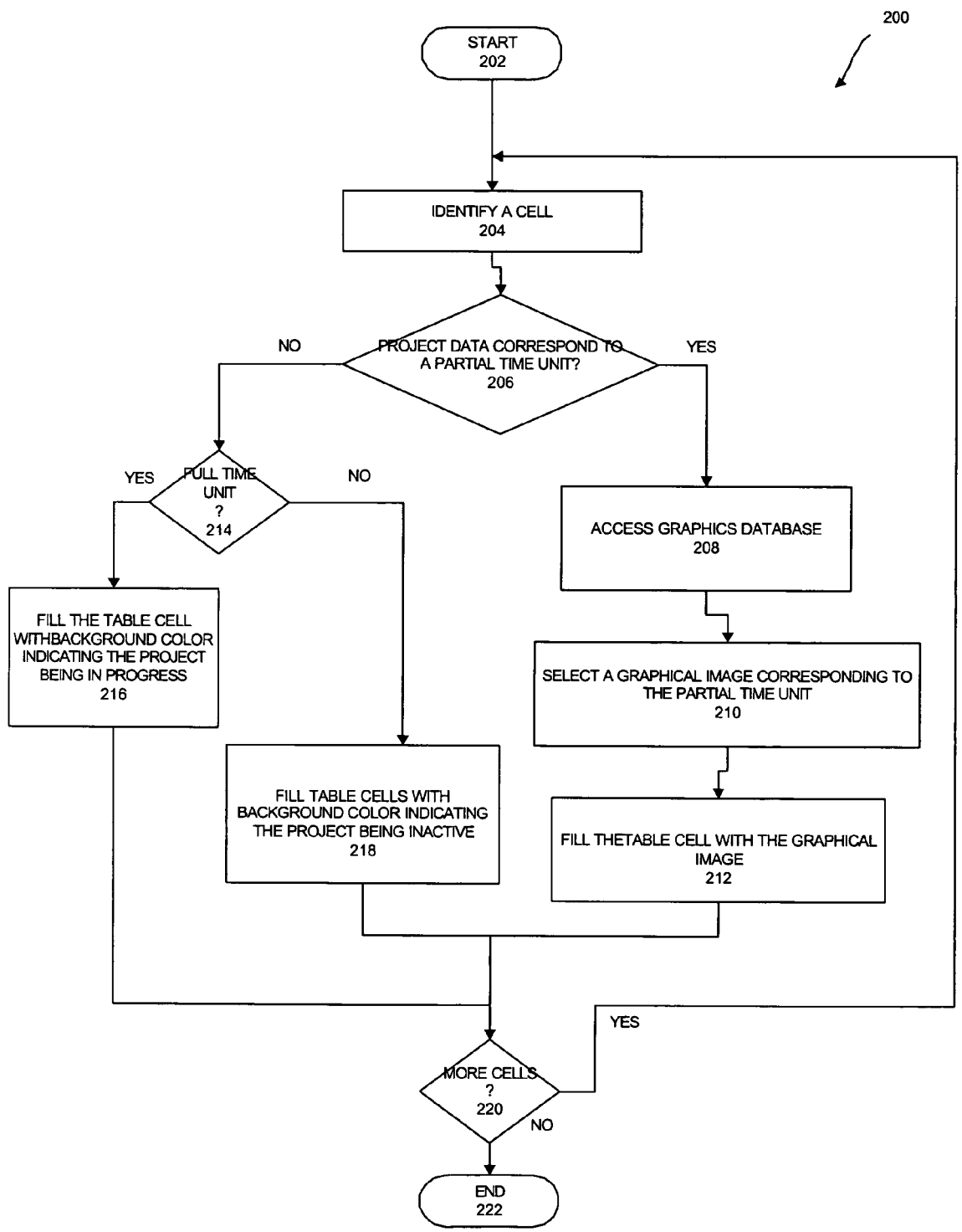
FIG. 2B is a flowchart illustrating a method to render project table cells in accordance with project data, according to one embodiment of the present invention

FIG. 2B is a flowchart illustrating a method 200 to render project table cells corresponding to project data, according to one embodiment of the present invention. The method 200 commences at operation 202. At operation 204, the table generator 20 identifies a project table cell to be processed. The table generator 20 then identifies project data corresponding to the identified project table cell. At operation 206, it is determined whether the project data corresponding to the project table cell corresponds to a partial time unit or to a full time unit. If it is determined at operation 206 that the project data for the project table cell corresponds to a partial time unit, then the cell rendering component 26 accesses the graphics repository 28 at operation 208. At operation 210, the cell-rendering component 26 selects a graphical image from the images stored in the graphics repository 28, the graphical image corresponding to a partial time unit corresponding to the project data. At operation 212, the cell-rendering component 26 fills the project table cell with the selected graphical image. If it is determined at operation 206 that the project data corresponding to the project table cell does not correspond to a partial time unit, then the method 200 proceeds to operation 214.

At operation 214, it is determined whether the project data corresponding to the project table cell is a full time unit or an empty time unit. If the project data corresponding to the project table cell is a full time unit, then, at operation 216, the cell rendering component 26 fills the project table cell with a background color indicating the project being in progress. If the project data for the project table cell does not correspond to a full time unit, then the cell-rendering component 26 fills the table cell with a background color indicating the project being inactive. This is done at operation 218. The method 200 then proceeds to operation 220, where it is determined whether there are more cells in the project table to be processed. The method 200 ends at operation 222.

It will be noted that, in one exemplary embodiment, the graphics repository 28 may store graphical images corresponding to a full time unit and to an empty time unit. The method 200 may then perform operations 208 through 212 regardless of or bypassing a determination at operation 206.

Figure 3:
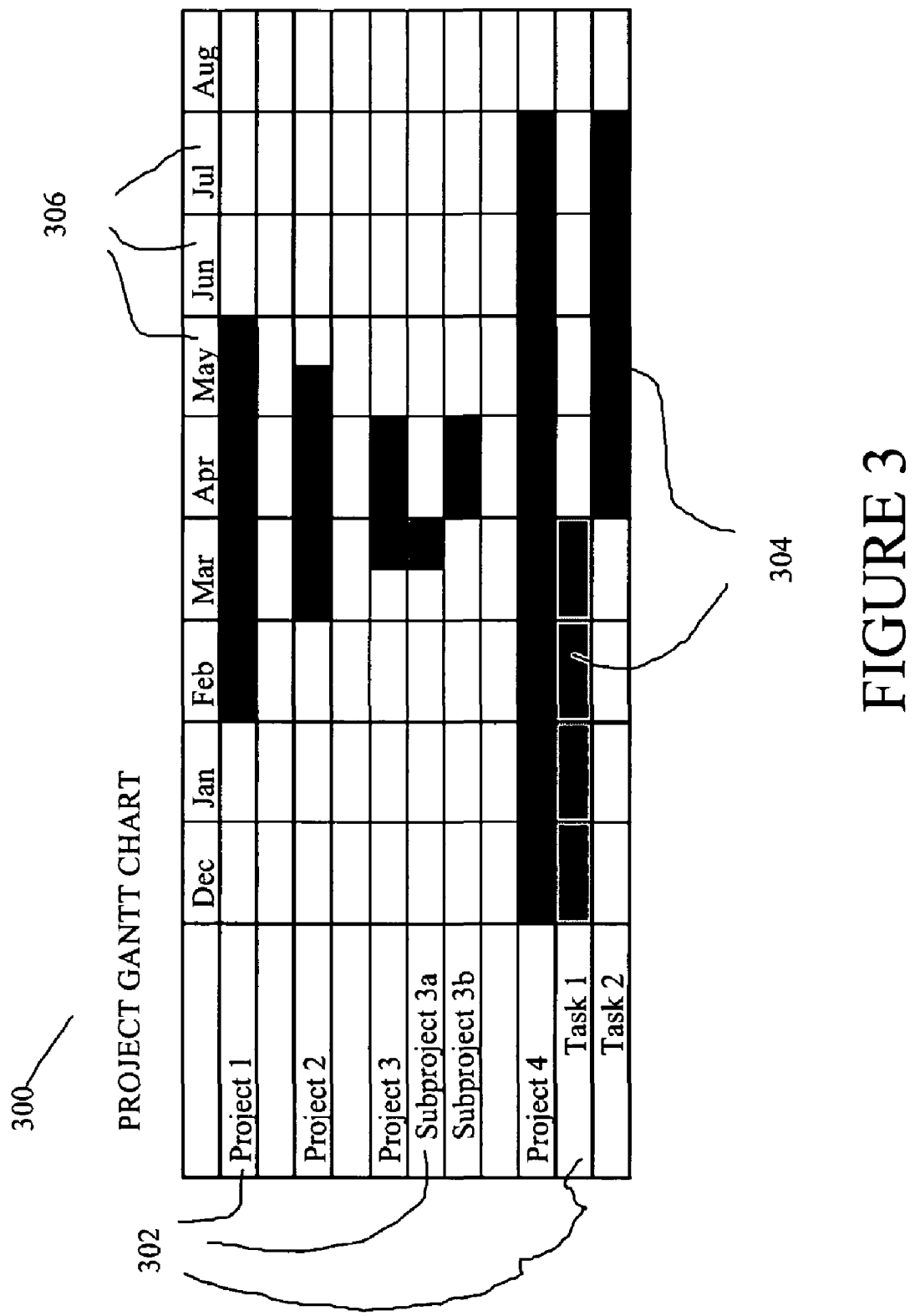
FIG. 3 is an exemplary Gantt chart generated by the system, according to one embodiment of the present invention.

FIG. 3 is an exemplary Gantt chart 300 generated by the project portfolio management system 12, according to one embodiment. The exemplary Gantt chart 300 includes elements 302 corresponding to row names. In the Gantt chart 300 the row names correspond to the project names such as Project 1, Project 2, Project 3, and Project 4. The column names in the Gantt chart 300 correspond to time units 304. In this illustration, the time units are months. The table cells 306 correspond to graphical elements of the Gantt chart 300. As is seen in the Gantt chart 300, Project 1 is active from the beginning of February through the beginning of June. The table cell corresponding to the progress of Project 1 for the month of February is represented by a full time unit. Therefore, this project cell could have been rendered by the cell rendering component 26 by applying a background color to the cell, the background color indicating the project being active (or in progress), as is described with respect to operation 216 of FIG. 2B. On the other hand, the table cell corresponding to the status of Project 2 in May represents a partial time unit. Thus, this cell corresponding to the status of Project 2 in May was rendered by the cell rendering component 26 by selecting a graphical image corresponding to the partial time unit, (here, the first part of May), as is described with respect to operation 220 of FIG. 2B. Similarly, the project table cell corresponding to Project 3 status in March is represented by a partial time unit, namely, the second part of March. Thus, the cell corresponding to the status of Project 3 in March was rendered by the cell rendering component 26 by accessing the graphics repository 28, selecting a graphical image corresponding to this partial time unit and filling the table cell with the selected graphical image as is described with respect to operations 208 to 212 of FIG. 2B.

Figure 3A:
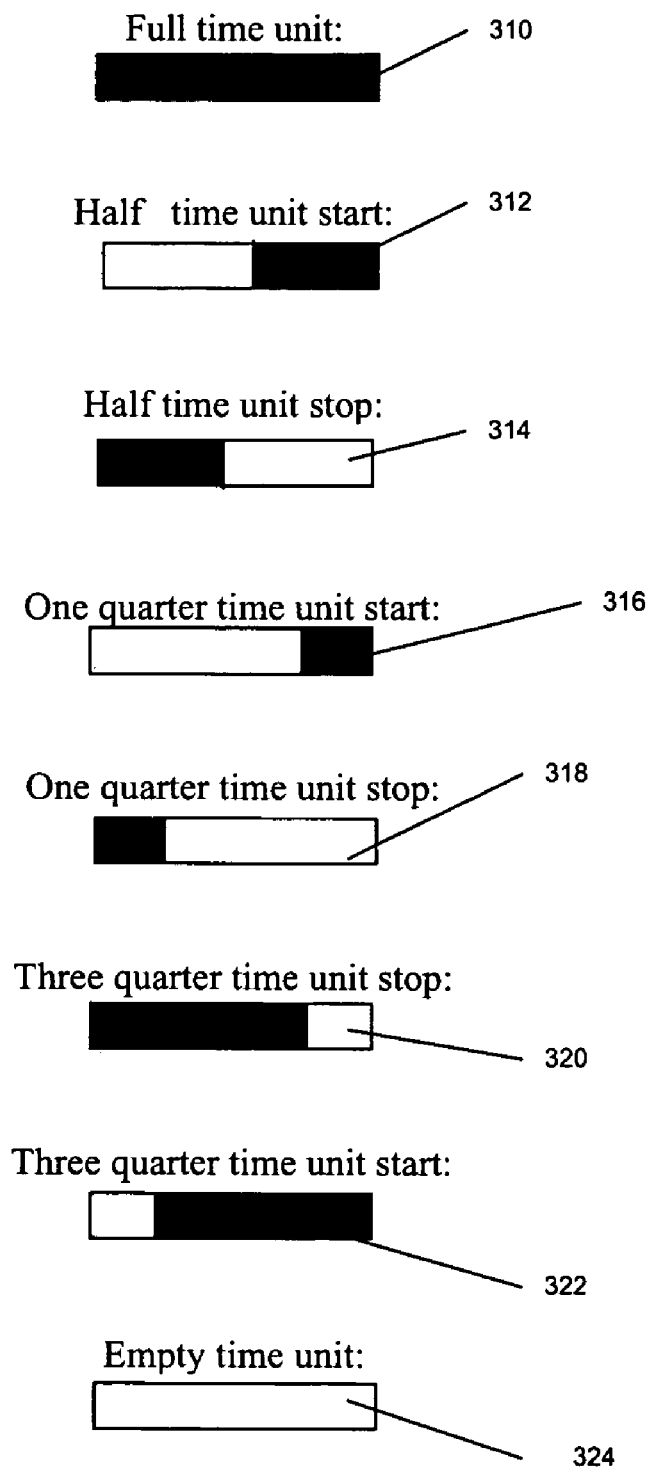
FIG. 3A illustrates exemplary graphical images utilized by the system, according to one embodiment of the present invention.

FIG. 3A illustrates exemplary graphical images utilized by the system 10, according to one embodiment. Block 310 corresponds to a full time unit. Block 312 corresponds to a half time unit start. Block 314 corresponds to a half time unit stop. Block 316 corresponds to a one quarter time unit start. Block 318 corresponds to a one quarter time unit stop. Block 320 corresponds to a three quarter time unit stop. Block 322 corresponds to a three quarter time unit start. Block 324 corresponds to an empty time unit. It will be noted that a project table cell data corresponding to a full time unit or to an empty time unit may be represented by a background color.

The project Gantt chart 300 may be provided to the client 14 as a dynamic web page. Returning to FIG. 3, if an event handling method is provided for a particular cell of the project Gantt chart 300, then a user may view additional information regarding the project by placing the mouse cursor on top of the cell he wishes to view. For example, if an event handling method is provided for a cell corresponding to the status of project 1 in February, then by placing a cursor over that cell, a user may be able to view additional information, such as, for example, the resources assigned to Project 1, additional milestones information, and other information. Additional information regarding the project may also be provided to the user responsive to the user's clicking on a cell or highlighting the cell.

It will be noted that a project Gantt chart may be generated by the project portfolio management system 12 responsive to a user's request or, for example, responsive to a predetermined event and without an explicit request from the user. The project portfolio management system 12 may be configured to store the generated project Gantt chart 300 for later access by the client 14 or by another user, in accordance with the other user's permission settings.

Returning to FIG. 1, the business management system 12 may provide business management tools to a user, such as resource and project management. The system 12 may utilize information related, for example, to projects and projects' schedules stored in the database 32 in order to provide a Gantt/bar chart image (e.g., a project flow chart) to the user. It is desirable to provide the user with a GUI that allows the user to modify the project data within the chart view and to enable the user to view additional information related to the chart as the user clicks on a particular image within the chart or, for example, places the cursor over the image.

The HTML-Business for Java (HTMLB) controls may be necessary to create a proper graphical user interface (GUI). HTMLB allows creating a design-oriented page layout. HTMLB may provide a user with a set of controls. The controls may be based, for example, on servlets and Java Server Pages (JSP) pages. A developer may use bean-like components or JSP tags. Renderer classes may be utilized to translate various components into HTML commands.

In addition to creating a proper GUI, a web application may need appropriate event handling to fill the application with live feed. There may be a number of controls that generate events. Java Server Pages (JSP) technology provides a simplified, fast way to create web pages that display dynamically generated content. The basic event handling occurs on the JSP level. The dynamic page component 18 may be used for enhanced event handling and easy session management. The dynamic page component 18, in one embodiment, uses the Business HTML for Java as API to design the GUI and handles the data and event transfer.

Figure 4:
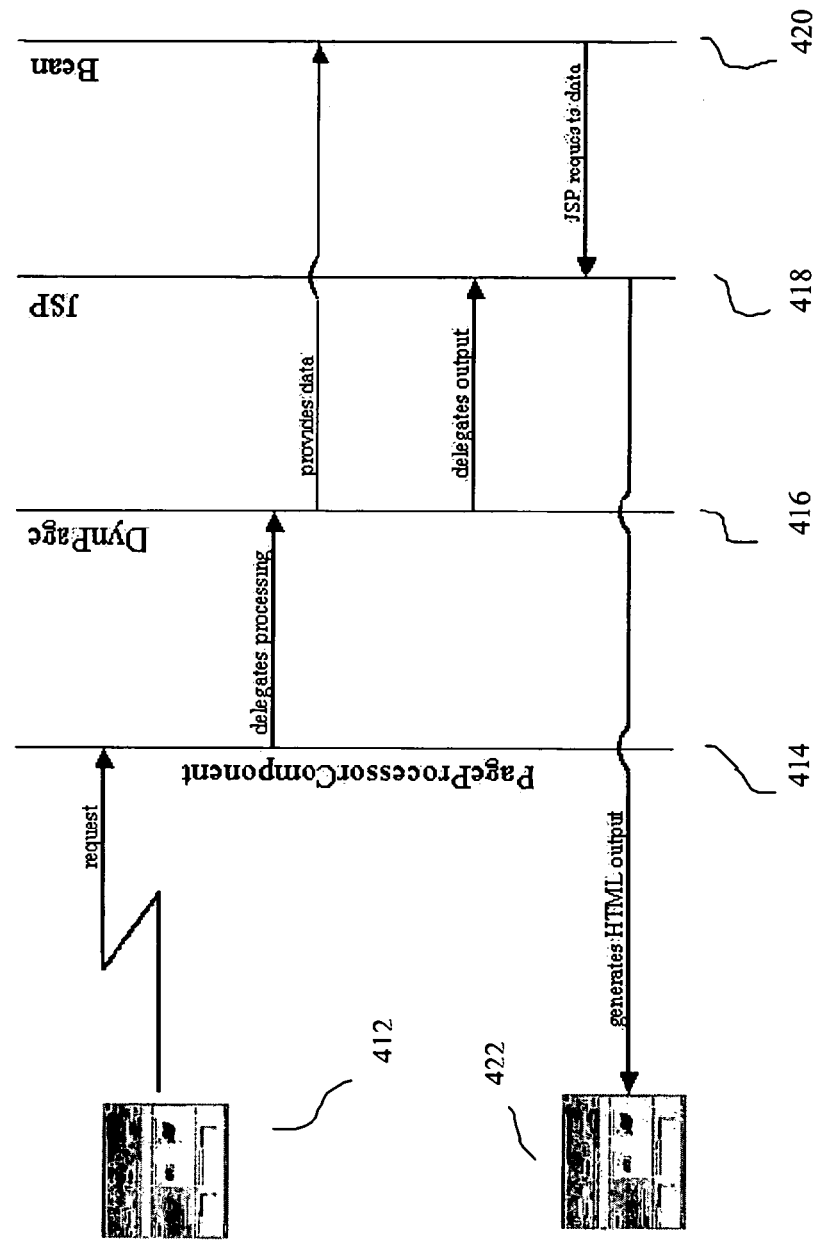
FIG. 4 is a diagrammatic representation of dataflow of a dynamic page component, according to one embodiment of the present invention.

FIG. 4 is a diagrammatic representation of dataflow of the dynamic page component 18, according to one embodiment of the present invention. In FIG. 4, a request from a web page 412 is received at the page processor component 414. The page processor component 414, in one exemplary embodiment, corresponds to the extractor 16 of FIG. 1. The page processor component 414 delegates the request processing to a dynamic page component 416. The dynamic page component 416, in one exemplary embodiment, corresponds to the dynamic page component 18 of FIG. 1. The exchange of data between the dynamic page component 416 and a JSP program 418 occurs by using a reusable software component 420. The reusable software component 420, in one exemplary embodiment, corresponds to the table view component 23 of FIG. 1, and may be implemented as a Java Bean. FIG. 4A is an implementation example 450 of the reusable software component 420 as a Java Bean.

The reusable software component 420 may be used to get and set "dynamic" data. The dynamic page component 416 may provide the reusable software component 420 with project data; and the JSP program 418 may read the project data. For example a user input may be stored in the reusable software component 420 and than displayed as text by the JSP program 418. Thus, the dynamic page component 416 may provide data associated with a request from the web page 412 to a reusable software component 420 (e.g., the table view component 23). The dynamic page component 416 may delegate generation of an output to the JSP program 418. The reusable software component 420 provides the requested data to the JSP program 418. Finally, the JSP program 418 generates HTML output resulting in a web page 422.

It will be noted that the exchange of data between the dynamic page component 416 and a JSP program 418 may also be effectuated utilizing a session object, a context object, or a request object.

Figure 5:
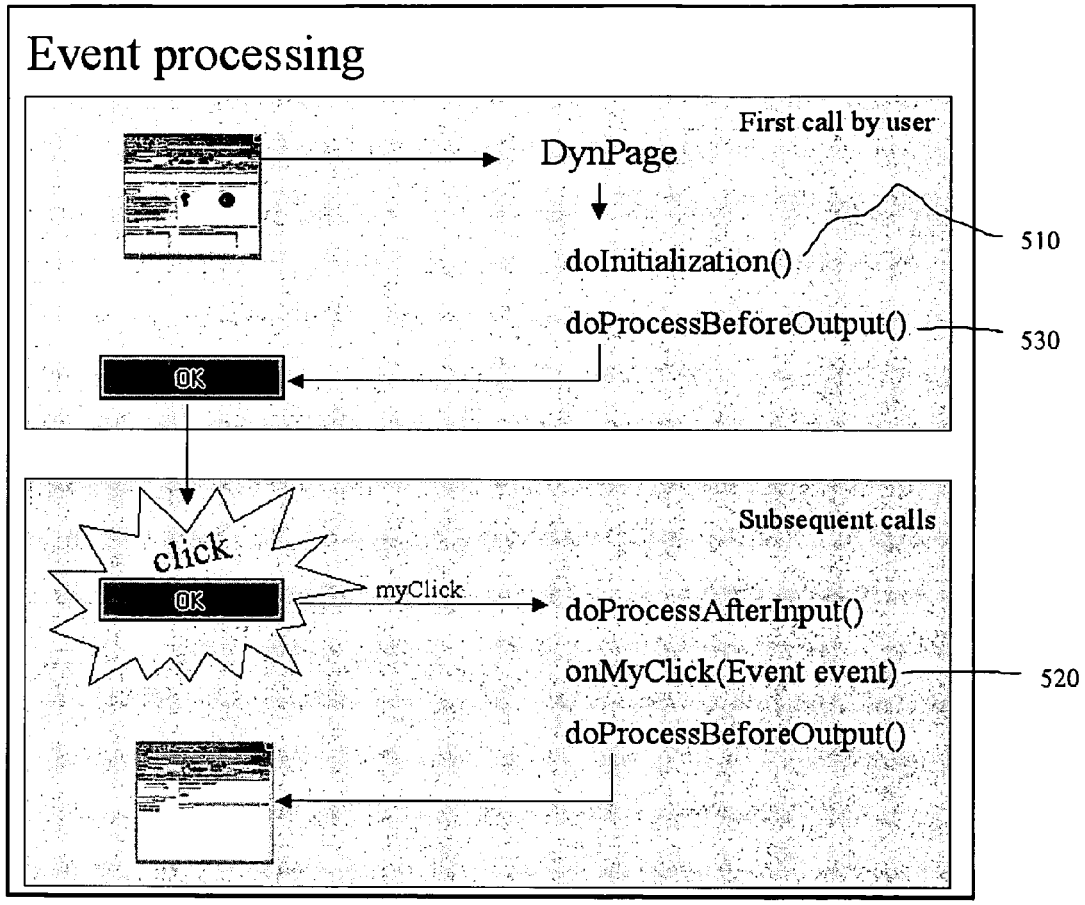
FIG. 5 is a diagrammatic representation of event processing by the dynamic page component, according to one embodiment of the present invention.

FIG. 5 is a diagrammatic representation of event processing by the dynamic page component 416, according to one embodiment. The event processing illustrated in FIG. 5 may be utilized to process the event handling methods generated by the dynamic page component 18 to allow users to view additional project information associated with a selected project table cell as described with reference to FIG. 2.

In one exemplary embodiment, the dynamic page component 416 includes an initialization method 510 (doInitialization), a processing after input method 520 (doProcessAfterInput), and a processing before output method 530 (doProcessBeforeOutput). The doInitialization method is called when the application is started. The call is made when the page is directly called per Uniform Resource Identifier (UR) without parameters and no event occurred. This method may be used to initialize data and to set up models. The doInitialization event may also be caused when another portal component on the same page sends an event. The doProcessAfterInput method is called when a web client sends a form to a web server. Except on doInitialization, the call to doProcessAfterInput is performed every time an event occurs on the client side. The doProcessBeforeOutput method is called before the form is sent to the web client. The call is performed every time even on doInitialization.

Figure 6:
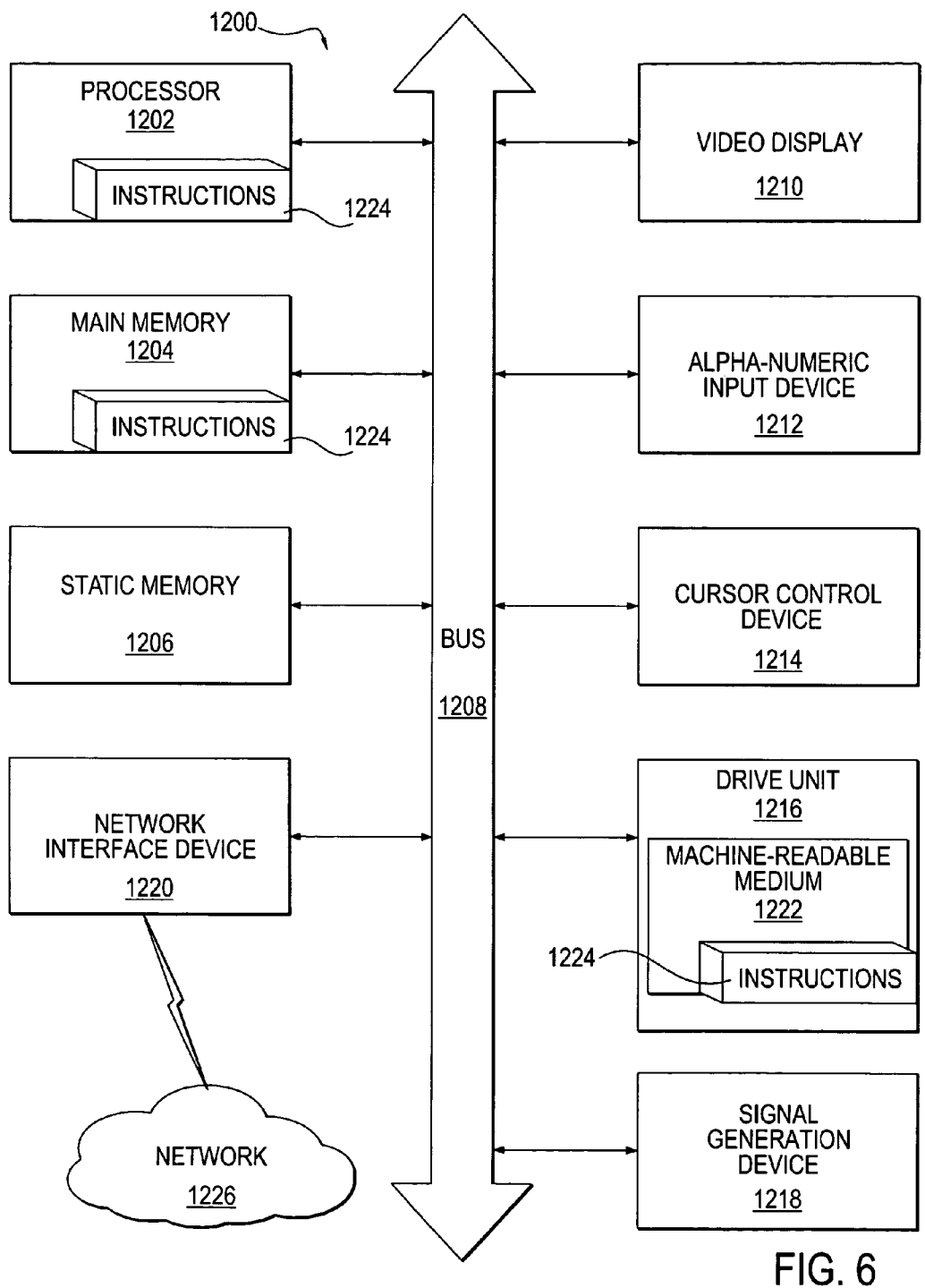
FIG. 6 is a diagrammatic representation of a computer system, within which a set of instructions, for causing the machine to perform any one or more of the methodologies discussed herein, may be executed.

FIG. 6 illustrates a diagrammatic representation of machine in the exemplary form of a computer system 1200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processor 1202 (e.g., a central processing unit (CPU) a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a cursor control device 1214 (e.g., a mouse), a disk drive unit 1216, a signal generation device 1218 (e.g., a speaker) and a network interface device 1220.

The disk drive unit 1216 includes a machine-readable medium 1222 on which is stored one or more sets of instructions (e.g., software 1224) embodying any one or more of the methodologies or functions described herein. The software 1224 may also reside, completely or at least partially, within the main memory 1204 and/or within the processor 1202 during execution thereof by the computer system 1200, the main memory 1204 and the processor 1202 also constituting machine-readable media. The software 1224 may further be transmitted or received over a network 1226 via the network interface device 1220.

While the machine-readable medium 1222 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention. The term "machine-readable medium" shall accordingly be taken to include, but not be limited to, solid-state memories, optical and magnetic media.

Thus, a method and system for generating a Gantt/bar chart have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system to create a chart for display on a client device, including:
   a repository for storing project data extracted from a project database associated with a client device;
   a graphics repository for storing a plurality of graphical images for representing extracted project data;
   a processor in communication with the repository and the graphics repository, for generating a project database table to represent the project data extracted from the project database associated with the client device, the processor further
      interfacing with a table view model interface to identify a table view model suitable for representing extracted project data represented in the project database table, the table view model containing a location in the graphics repository of graphical images for representing the extracted project data that is represented in the project database table;
      generating a table view of extracted project data represented in the project database table in accordance with the identified table view model;
      generating a chart image utilizing the project database table in accordance with the generated table view, the chart image being one of a Gantt chart and a bar chart; and
   wherein the processor further sends the chart image to the client device for display.

2. The system of claim 1, wherein the processor generates the project database table according to a data model associated with extracted project data.

3. The system of claim 1, wherein generating the chart image utilizing the project database table in accordance with the generated table view includes rendering at least one cell of the project database table, wherein the at least one cell represents a portion of the chart image in accordance with the project data.

4. The system of claim 3, wherein rendering the at least one cell of the project database table includes identifying a graphical image in the graphics repository of graphical images based on the location contained in the identified table view model, and applying the graphical image to the at least one cell.

5. The system of claim 4, wherein the graphical image from the plurality of graphical images represents one of a full time unit, an empty time unit, and a partial time unit.

6. The system of claim 5, wherein rendering the at least one cell of the project database table is identifying a background color and applying the background color to the at least one cell.

7. The system of claim 6, wherein rendering the at least one cell of the project database table includes applying the background color to the at least one cell if the project data corresponding to the at least one cell is one of a full time unit and an empty time unit.

8. The system of claim 1, wherein the project data includes a project name, the start date of the project, and project duration.

9. The system of claim 1, wherein the processor further generates an event related to the at least one cell, the event being utilized to display additional information responsive to identifying an action directed at the at least one cell.

10. The system of claim 9, wherein the action directed at the at least one cell is a click.

11. The system of claim 1, wherein the chart image is a dynamic web page.

12. The system of claim 1, wherein the processor sends the chart image to the client device for display utilizing a web portal.

13. A computer-implemented method to automatically create a chart for display on a display device, the method including:
   receiving project data associated with a data model, the associated data model suitable for representing project data extracted from a project database associated with a client device;
   generating a project database table representing the extracted project data based on the associated data model;
   identifying a table view model suitable for representing the extracted project data, the table view model containing a location in a graphics repository of graphical images for representing the extracted project data;
   generating a table view of the extracted project data in accordance with the identified table view model;
   generating a chaff image utilizing the project database table in accordance with the generated table view, the chart image being one of a Gantt chaff and a bar chart; and
   displaying the chart image on a display device.

14. The method of claim 13, wherein the generating of the chart image utilizing the project database table in accordance with the generated table view includes rendering a cell of the project database table, wherein the cell represents a portion of the chart image corresponding to a portion of the project data represented in the project database table.

15. The method of claim 14, wherein the rendering of the cell includes identifying a graphical image in the graphics repository to depict the corresponding portion of the project data represented in the project database table from based on the location contained in the identified table view model and applying the graphical image to the cell.

16. The method of claim 15, wherein the identified graphical image represents one of a full time unit, an empty time unit and a partial time unit.

17. The method of claim 16, wherein the rendering of the cell includes identifying a background color and applying the background color to the cell.

18. The method of claim 17, wherein applying the background color to the cell is responsive to identifying the graphical image representing one of the full time unit and the empty time unit.

19. The method of claim 14, including displaying the chart image to a user, utilizing a web portal.

20. The method of claim 13, wherein the project data includes a project name, the start date of the project, and project duration.

21. The method of claim 13, including enabling a user to view additional information responsive to an action by a user, the action being directed at the cell.

22. The method of claim 21, wherein the action is a click.

23. The method of claim 13, wherein the chart image is a dynamic web page.

24. A machine-readable medium having stored thereon data representing sets of instructions which, when executed by a machine, cause the machine to:
   receive project data having a data model, the data model suitable for representing project data extracted from a project database associated with a client device;
   generate a project database table representing the extracted project data based on the data model;
   identify a table view model suitable for representing the extracted project data, the table view model containing a location in a graphics repository of graphical images for representing the extracted project data;
   generating a table view of the extracted project data in accordance with the identified table view model;
   generate a chart image utilizing the project database table in accordance with the generated table view, the chart image being one of a Gantt chart and a bar chaff; and
   display the chart image on a display device.

25. The machine-readable medium of claim 24, wherein the generating of the chart image utilizing the project database table in accordance with the generated table view includes rendering a cell of the project database table, wherein the cell represents a portion of the chart image corresponding to a portion of the project data represented in the project database table.

26. The machine-readable medium of claim 25, wherein the rendering of the cell includes identifying a graphical image in the graphics repository to depict the corresponding portion of the project data represented in the project database table from based on the location contained in the identified table view model and applying the graphical image to the cell.

27. The machine-readable medium of claim 26, wherein the identified graphical image represents one of a full time unit, an empty time unit and a partial time unit.

28. The machine-readable medium of claim 25, wherein the rendering of the cell includes identifying a background color and applying the background color to the cell.

29. The machine-readable medium of claim 28, wherein applying the background color to the cell is responsive to identifying the graphical image representing one of the full time unit and the empty time unit.

30. The machine-readable medium of claim 24, wherein the project data includes a project name, the start date of the project, and project duration.

31. The machine-readable medium of claim 24, the method further comprising:
   enabling a user to view additional information responsive to an action by a user, the action being directed at the cell.

32. The machine-readable medium of claim 31, wherein the action is a click.

33. The machine-readable medium of claim 24, wherein the chaff image is a dynamic web page.

34. The machine-readable medium of claim 24, wherein displaying the chart image on a display device includes displaying the chaff image to a user utilizing a web portal.

* * * * *

UNITED STATES PATENT AND TRADEMARK OFFICE
CERTIFICATE OF CORRECTION

PATENT NO. : 7,610,549 B2
APPLICATION NO. : 10/852764
DATED : October 27, 2009
INVENTOR(S) : Peter Vignet It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 508 days.

Signed and Sealed this

Twelfth Day of October, 2010

David J. Kappos
*Director of the United States Patent and Trademark Office*